United States Patent [19]

Decker

[11] Patent Number: 5,334,980
[45] Date of Patent: Aug. 2, 1994

[54] METHOD AND SYSTEM FOR SHARPENING IMPULSE RESPONSE IN A SYNTHETIC APERTURE RADAR

[75] Inventor: Martin J. Decker, Baltimore, Md.

[73] Assignee: Westinghouse Electric Corp., Pittsburgh, Pa.

[21] Appl. No.: 100,825

[22] Filed: Aug. 2, 1993

[51] Int. Cl.5 .................................. G01S 13/90
[52] U.S. Cl. ................................................ 342/25
[58] Field of Search .................................... 342/25

[56] References Cited

U.S. PATENT DOCUMENTS

| | | | |
|---|---|---|---|
| 4,064,510 | 12/1977 | Chabah | 342/25 |
| 4,086,590 | 4/1978 | Goggins, Jr. | 342/25 |
| 4,825,213 | 4/1989 | Smrek | 342/25 |
| 4,978,960 | 12/1990 | Newcomb et al. | 342/25 |
| 4,978,961 | 12/1990 | Williams | 342/25 |

OTHER PUBLICATIONS

Publication IEEE Transactions On Geoscience and Remote Sensing, vol. 36, No. 5, Sep. 1988, titled "Interferometric Synthetic Aperture Microwave Radiometry For The Remote Sensing Of The Earth," Christopher S. Ruf, Calvin T. Swift, Alan B. Tanner, David M. Le Vine.

*Primary Examiner*—Gilberto Barrón, Jr.

[57] ABSTRACT

A synthetic aperture radar system performing two dimensional monopulse measurement of the return data.

12 Claims, 6 Drawing Sheets

METHOD AND SYSTEM FOR SHARPENING IMPULSE RESPONSE IN A SYNTHETIC APERTURE RADAR

BACKGROUND OF THE INVENTION

1. Field of Invention

The present invention relates to synthetic aperture radar; and more particularly to a method and system for sharpening the impulse response of the return signals of a synthetic aperture radar.

2. Description of Related Art

Synthetic aperture ground mapping utilizes a system that generates pulses continuously at a frequency constant enough to be coherent for a time interval during which an airborne radar platform travels a predetermine distance. All echoes returned during this distance are processed as though it were a single antenna having an aperture as long as the distance traveled by the platform during each particular time interval. The scanning in range, of course, corresponds to the speed of light, and the scanning in azimuth corresponds to the speed of the airborne platform. The location in azimuth is determined by the Doppler Shift and the location in range is based upon the time of return.

Resolution is typically defined as the ability to distinguish two closely spaced targets. However, with respect to mapping, resolution is also referred to in terms of the two dimensions; that is, the ground area dimensions in range and azimuth that are distinguishable by the radar system. Although, in synthetic aperture ground mapping, the resolution capability of the radar is extended beyond the limits of frequency and antenna aperture size, there are several factors which tend to spread the target spectrum resulting in resolution loss both in range and azimuth. For example, in the synthetic array concept, the received signals are phase shifted and summed during each of the predetermined time intervals to provide a constant phase front at the desired pointing angle so that the return signals are effectively added in phase. However, in the time it takes to form the synthetic aperture, the aspect angle to the target changes slightly which results in the targets doppler changing and resulting in a spread of the target spectrum.

Additionally, since the amplitude return from a point target is relatively flat as it enters the receiver, the received signal is weighted to reduce the side lobe levels. However, in improving the side lobe levels, there is an accompanying loss of resolution because of the increase in spectral width of the response. This loss of resolution is particularly noticeable with respect to isolated point targets, and also boundaries where there is a departure in elevation, such as buildings or other abrupt changes.

In light of the foregoing, there is a need to provide a synthetic aperture radar where the side lobes of the return energy are effectively reduced, and yet impulse responses corresponds to the edge contrast of boundaries and isolated point targets are enhanced.

SUMMARY OF THE INVENTION

Accordingly, the present invention is directed to a synthetic aperture radar system and method that substantially obviates one or more of the problems due to limitations and disadvantages of the related art.

Additional features and advantages of the invention will be set forth in the description which follows, and in part will be apparent from the description, or may be learned by practice of the invention. The objectives and other advantages will be realized and obtained by the system and method particularly pointed out in the written description and claims hereof as well as the appended drawings.

To achieve these and other advantages and in accordance with the purpose of the invention, as embodied in broadly described, the invention is a method of sharpening impulse response of synthetic aperture return data that includes collecting complex range and azimuth return data; forming three apertures of the collected complex data, one of the three apertures generating data corresponding to sum weighting in range and azimuth, a second of the apertures generating data corresponding to sum weighting in range and difference weighting azimuth, and a third of the apertures generating data corresponding to sum weighting in azimuth and a difference weighting in range. The generated data in each of the three apertures is transformed into a two dimensional map format. Two dimensional monopulse measurement is performed of combined transformed generated data in the map format, having bins corresponding to range and azimuth. Additionally, the method involves calculating the difference data in range and the difference data in azimuth for each of the bins; and displaying the return energy in the individual range and azimuth bins in accordance with a ratio of the sum data of the range and the difference data of the range in the range bins, and a ratio of the sum data of the azimuth and the difference data of the range in each of the azimuth bins.

In another aspect, the invention is a synthetic aperture radar system that includes means for collecting complex range and azimuth return data during each look of the synthetic aperture antenna; means for storing the collected data in three memories; means including the three memories including the three for generating data corresponding to sum weighting in range and azimuth, sum weighting in range and delta weighting in azimuth, and sum weighting in azimuth and delta weighting in range; means for transforming the generated data in each of the three memories into a two dimensional map format; means for performing two dimensional monopulse measurement of the combined transformed generated data in the map format, the map format including bins corresponding to range and azimuth; means for calculating the difference data in range and the difference data in azimuth for each of the bins; and means for displaying the return energy in the individual range and azimuth bins in accordance with the ratio of the sum data in range and the difference data in range in the range bins, and a ratio of the sum data in azimuth and the difference data in range in each azimuth bin.

It is to be understood that both the foregoing general description and the following detailed description are exemplary and explanatory and are intended to provide further explanation of the invention as claimed.

BRIEF DESCRIPTION OF DRAWINGS

The accompanying drawings are included to provide a further understanding of the invention and are incorporated in and constitute a part of this specification, illustrate one embodiment of the invention, and together with the description serve to explain the principles of the invention.

DESCRIPTION OF THE PREFERRED EMBODIMENT

Figure 1:
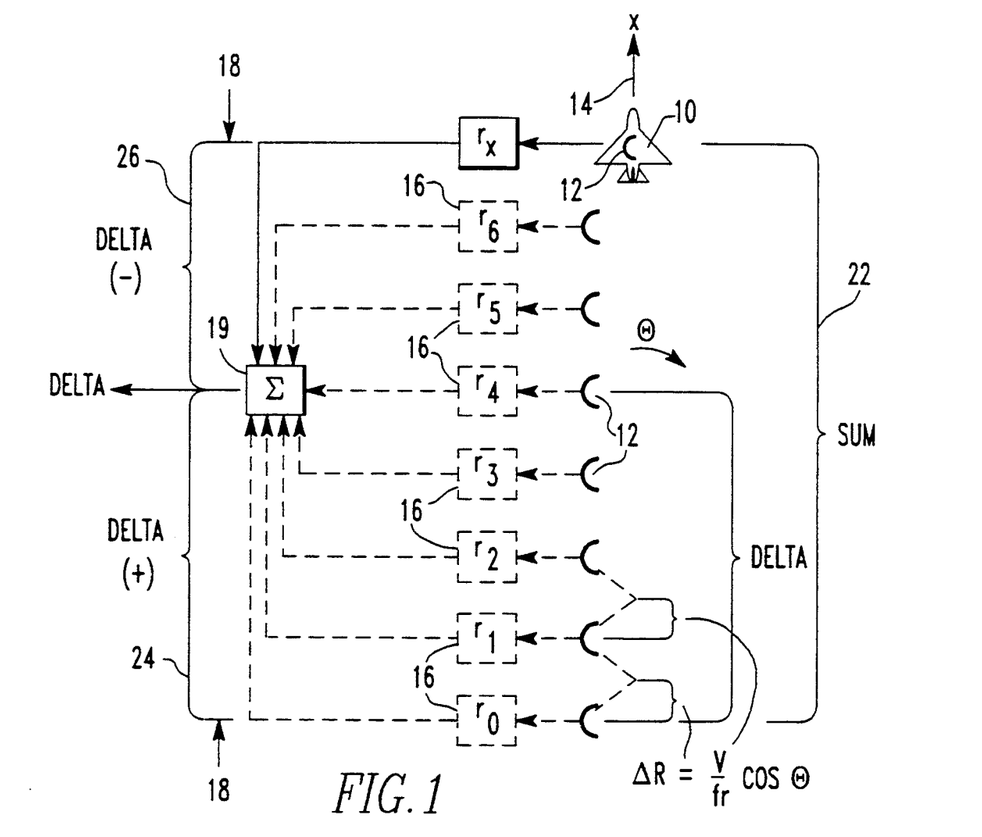
FIG. 1 is a representation of synthetic aperture radar illustrating the splitting of the aperture in accordance the present invention.

Referring to FIG. 1, an airborne platform having a synthetic aperture radar (SAR) system is generally referred to at 10. An antenna 12 is pointed in a direction, which may be orthogonal or oblique relative to the direction of travel of the aircraft in a direction referred to by the arrow 14. As the aircraft travels in the direction 14, the antenna 12 continuously transmits pulses represented by boxes 16 in the direction 14 for a finite period of time during which the aircraft may travel a distance indicated by arrows 18. This distance 18 is referred to as the synthetic array length. In other words this distance corresponds to the size of an antenna array if the array were located in a stationary position. Each transmission point of a pulse which is indicated by boxes 16 corresponds to an element 16 in the synthetic array with the spacing between synthetic array elements as the distance the aircraft travels during each interpulse period. In order to point the synthetic array at a particular angle, the received signals must be phase shifted as in an electronically scanned real array. The phase shifted return signals from each synthetic array element are summed at block 19. By processing the return signals in this manner a long synthetic array can be formed corresponding to the distance 18, for example.

In accordance with the present invention, the return data from this synthetic antenna array is processed so as to simulate a monopulse antenna. This is accomplished by processing the combined signals reflected by the entire synthetic array 18, in order to provide a SUM function as indicated at bracket 22; and also to process the return signals from each half of the synthetic elements or pulses 16 in positive and negative azimuth and elevation simulated quadrants as represented by brackets 24 and 26 to provide a DELTA function. The SUM function provides a peak close at the boresight of the synthetic aperture and the DELTA function provides a null at the boresight as hereinafter shown.

Figure 2:
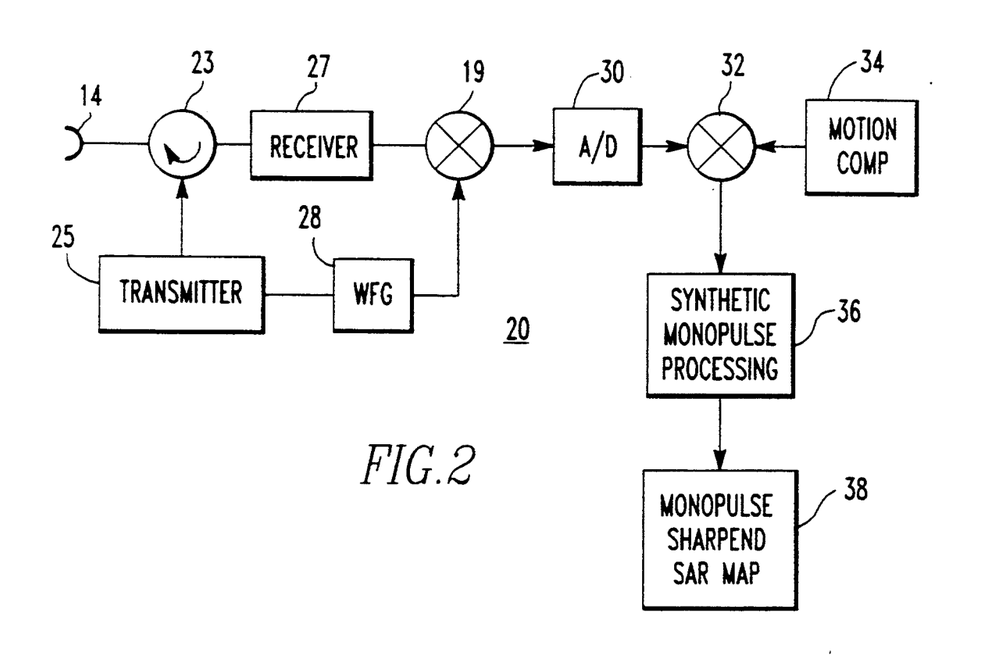
FIG. 2 is a block diagram of a synthetic aperture radar system in accordance with the present invention.

Referring to FIG. 2 a synthetic aperture radar system employing the principles of the present invention is referred to generally by reference numeral 20. System 20 includes the antenna 12, a transmit receive switch 23, a transmitter 25, and a receiver 27. Since this is a coherent system, a wave form generator 28 generates pulses of a certain phase which are transmitted by the transmitter 25 through antenna 12 as previously mentioned. The return pulses are received by antenna 12 and compared with the phase of the transmitted pulses at the summing device 19. The return pulses, of course, will be doppler shifted and the angular location of the reflected energy will be calculated in accordance with the doppler shift of the pulses from the phase of the transmitted pulse. This difference is then converted to digital data by an A to D converter 30, and the return data is weighted at summing device 32 in order to compensate for the motion of the aircraft in a well known manner by apparatus at block 34.

In accordance with the present invention, the return data is subjected to synthetic monopulse processing at block 36 resulting in a monopulse sharpened synthetic aperture radar map as indicated at block 38.

The present invention involves collecting the return data of the SAR system in range and azimuth. As herein embodied, and referring to FIG. 3, the SAR data which is collected is complex, that is, the in line (I) data and the quadrature (Q) data, is collected in the Inverse FOURIER space domain as indicated in block 40. This data is collected for processing during each of the precise time intervals that correspond to the size of the synthetic antenna array.

Figure 3:
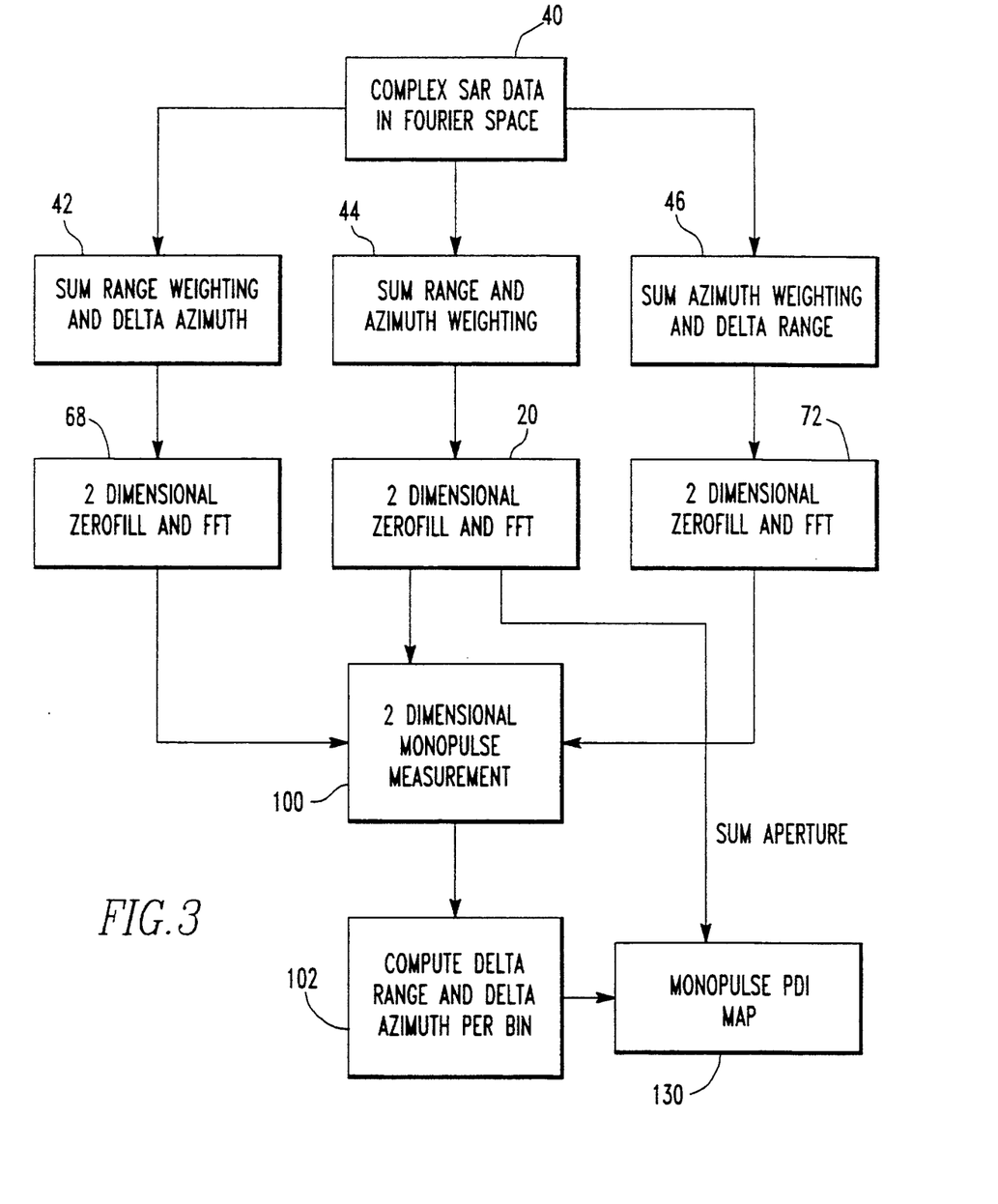
FIG. 3 is a functional block diagram of the synthetic monopulse processing of the return data in accordance with one embodiment of the invention.

The system then forms three apertures for the collected complex data, a first of the three apertures generates data corresponding to SUM weighting in range and azimuth, a second of the apertures generates data corresponding to SUM weighting in range and DELTA weighting in azimuth, and a third of the apertures generates data corresponding to SUM weighting in azimuth and a DELTA weighting in range. The SUM weighting is preferably TAYLOR weighting that is accomplished over the entire synthetic antenna. The DELTA weighting involves calculating the return data over each half of the synthetic array in both azimuth and range. In accordance with the present invention, this provides the information that is required for the monopulse processing of the data as hereinafter described. As herein embodied, the three apertures are formed by copying the data into three separate memories. The data from a first memory 42 is SUM weighted in range and DELTA weighted in azimuth. The data from a second memory 44 is SUM weighted in both range and azimuth. The data from a third memory 46, is SUM weighted in azimuth and DELTA weighted in range.

Figure 4A:
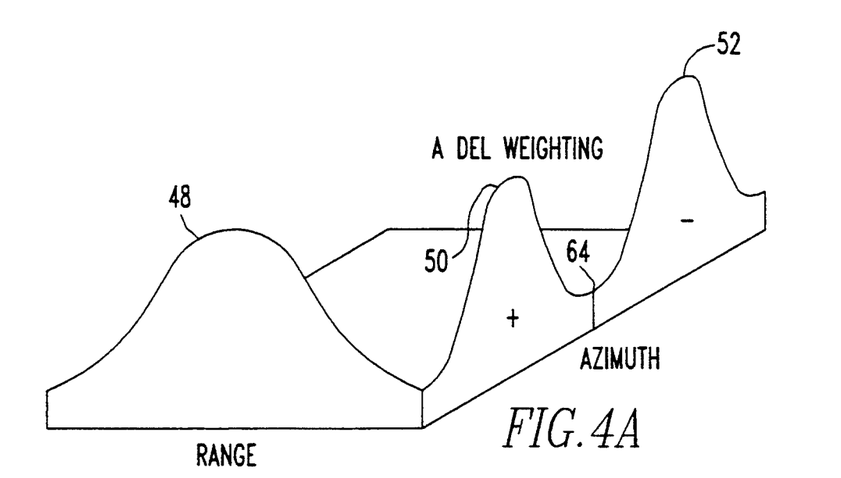
FIGS. 4A, 4B, and 4C are schematic representations of the weighted return data of the present invention.
Figure 4B:
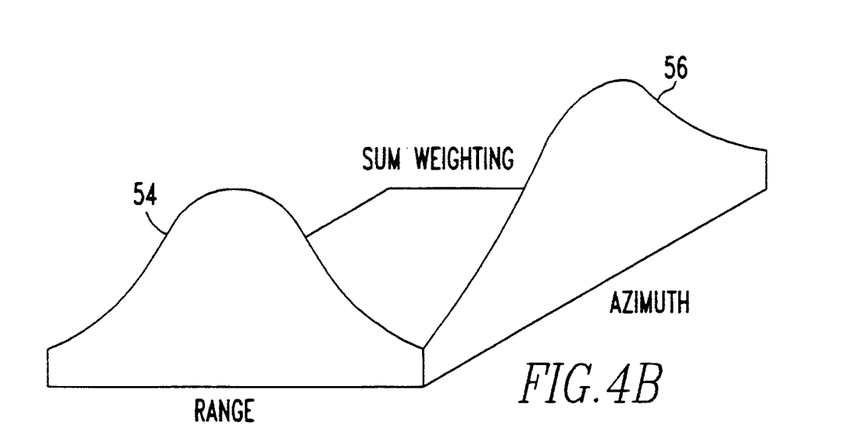
Figure 4C:
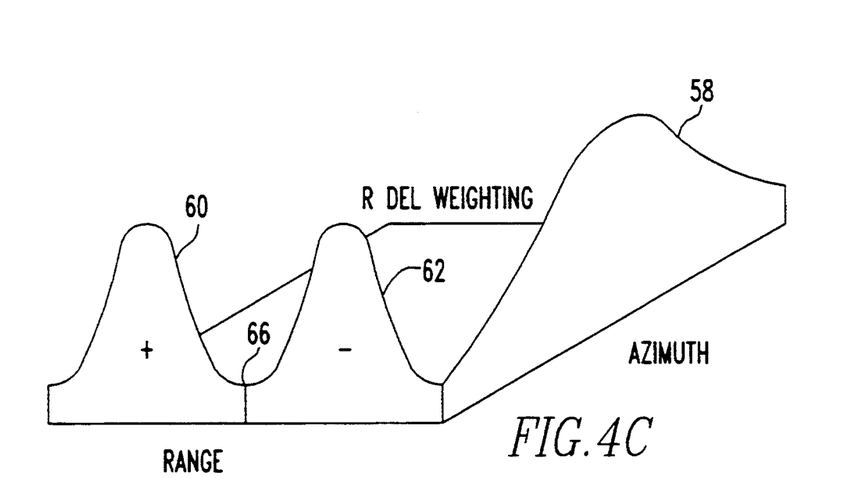

Referring to FIGS. 4A, 4B, and 4C, the weighting function described in connection with aperture 42 of FIG. 3, is shown in FIG. 4A. Waveform 48 represents the SUM weighting function in range and waveforms 50 and 52 represent the DELTA weighting function in azimuth. The weighting function of aperture 44 is represented in FIG. 4B wherein waveform 54 corresponds to the SUM weighting function in range and waveform 56 corresponds to the SUM weighting function in azimuth. Referring to FIG. 4C, waveform 58 represents the SUM weighting function in azimuth and waveforms 60 and 62 represent the DELTA weighting function in range. These weighting functions are used to reduce the side lobes to an acceptable level. However, in implementing such a reduction, the true impulse response of the system is spread. The DELTA weighting is particularly critical because energy in these side lobes will compete with the monopulse null and may bias the monopulse measurement. The monopulse null in the DELTA functions is represented at 64 in FIG. 4A and 66 in FIG. 4C. The SUM weighting is an even symmetrical function formed by multiplying two one dimensional weighting functions in both the range and azimuth dimension, usually minus 35 dB TAYLOR weighting. The range DELTA weighting is an odd symmetrical function along the range dimension and an even symmetrical function along the azimuth dimension. The azimuth DELTA weighting is an odd symmetrical function along the azimuth dimension and an even symmetrical function in range.

In accordance with the present invention, in each of the three apertures, the generated data is transformed into a two dimensional map format. Referring again to FIG. 3, the weighted data from aperture 42 is transformed into a two dimensional format represented at block 68. The weighted data from aperture 44 is transformed into two dimensional data as shown at block 70; and the data from aperture 46 is converted from the two dimensional format at block 72. This is accomplished by fast FOURIER transforming the data to the image or spatial domain. As indicated at block 68, 70, and 72, of FIG. 3 prior to transforming the data to the image domain, each aperture may be zero filled to increase the number of zero pixels across the impulse response. Zero filling in the FOURIER domain may be used to reduce the monopulse measurement quantization by increasing the number of coherent samples per impulse response. This requires additional processing because all three apertures should be zero filled. Instead of zero filling in the FOURIER domain, it may be desirable to assign additional memory bins in the image domain between true filter points. Although this will reduce the monopulse measurement quantization, the clutter may track the true filter centers forming stripes which will create excessive speckling.

Figure 5A:
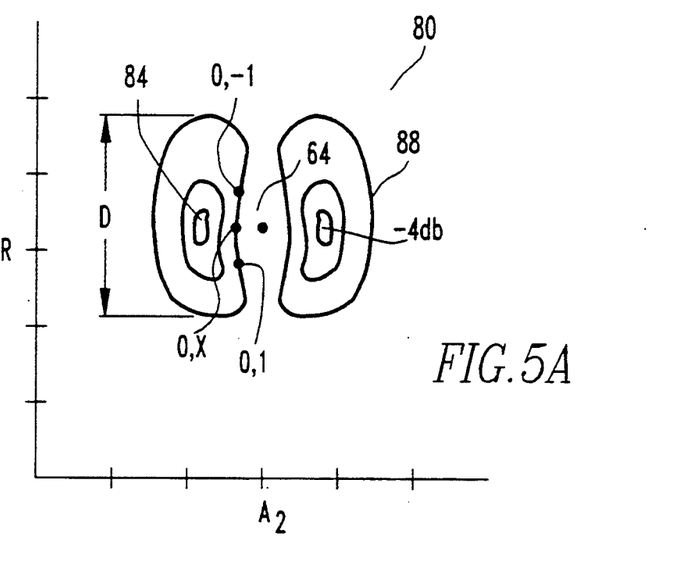
FIG. 5A is a diagramatic representation of SUM weighting of the return signals during a radar look.

Referring to FIG. 5A, which illustrates in two dimensions the function described in connection with block 68 of FIG. 3 for the aperture 42. Each of the columns 80 correspond to range and each of the rows 82 correspond to azimuth. The SUM weighting in range results in an impulse response represented over the length D where the greatest amplitude is indicated at point 84 for the negative half of the aperture which is referred to by waveform 52 in FIG. 4A; and also at point 86 for the positive half of the aperture represented by the aperture of waveform 50 of FIG. 4A. The contour lines 88 represents increases in amplitude to the peaks 84 and 86 respectively. The area between the contoured portions 88 of FIG. 5A represents the null portion represented generally at 64.

Figure 5B:
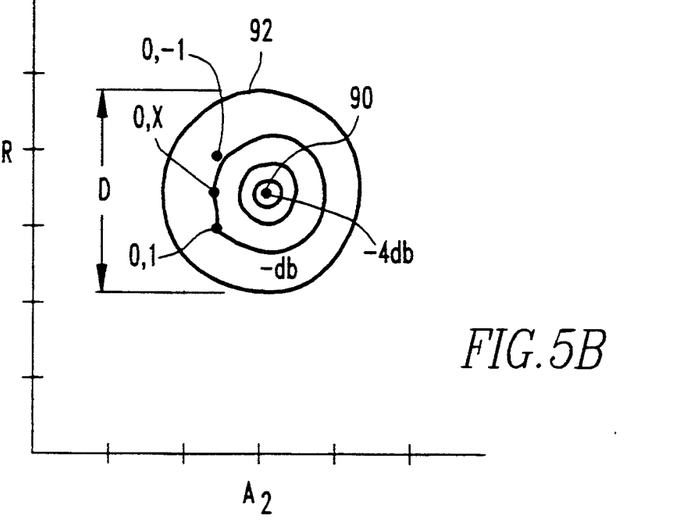
FIG. 5B is a diagramatic representation of DELTA weighting in range.
Figure 5C:
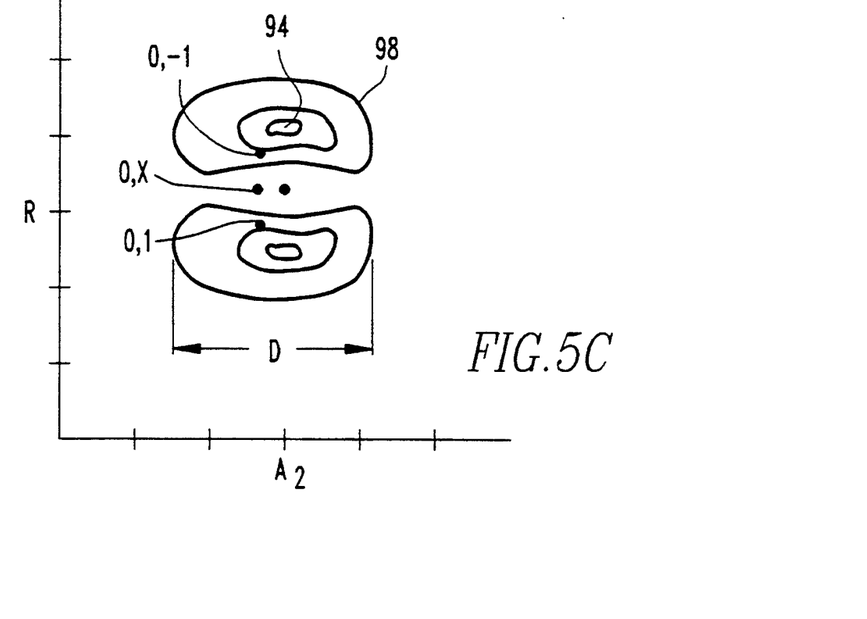
FIG. 5C is a graphical representation of the return data that is DELTA weighted in azimuth.

Referring to FIG. 5B, which illustrates the SUM function in both range and azimuth as performed at block 70 for aperture 44, illustrates the point of greatest amplitude at 90 with contour lines 92 representing decreasing amplitude from the point 90. Referring to FIG. 5C, points 94 and 96 represents the DELTA function in range. Reference numeral 94 corresponds to the peak of waveform 60 of FIG. 4C, and point 96 corresponds to the peak of waveform 62 of FIG. 4C with contour lines 98 representing the decrease in amplitude from such points. The dimension D corresponds to the SUM weighting in azimuth as represented by waveform 58 of FIG. 4C.

In accordance with the present invention, two dimensional monopulse measurement of the combined transformed generated data in map format, wherein the map format includes range and azimuth cells, is performed. This performance includes calculating DELTA data in range and DELTA data in azimuth for each of the bins.

Referring again to FIG. 3, the image data from apertures 42, 44, and 46 are combined at block 100 for performing the monopulse measurement. The DELTA data in both range and azimuth for each bin is performed at block 102.

Figure 6:
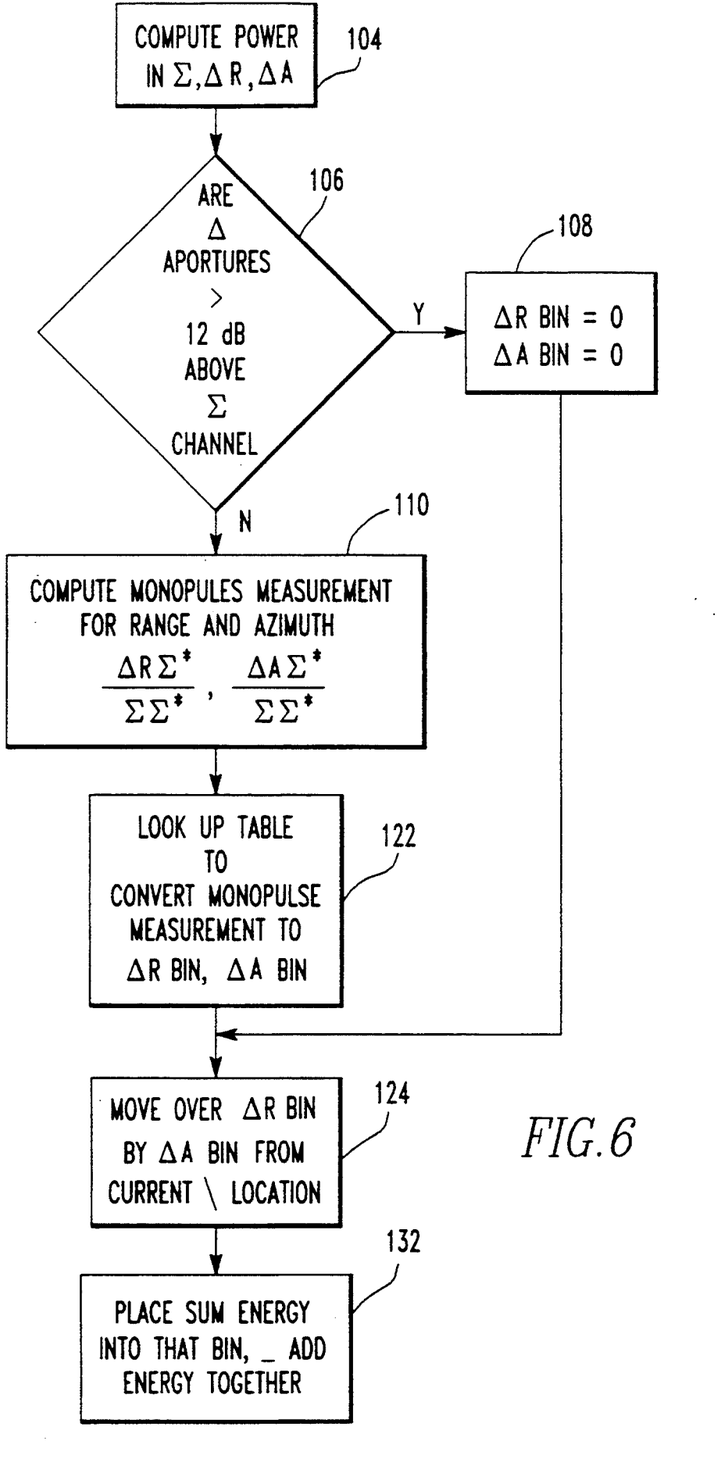
FIG. 6 is a flow chart illustrating the steps in the two dimensional monopulse measurement of FIG. 3 in accordance with the present invention.

Referring to FIG. 6, the monopulse measurement is carried out by first computing the power in each of the SUM, DELTA range, and DELTA azimuth apertures as indicated at block 104. Prior to computing the monopulse measurement ratios, the DELTA apertures 42 and 46 (See FIG. 3) are compared with the power in the aperture 44 at block 106. In the event either of these apertures are greater than 12dB above the SUM aperture 44, then the DELTA range bin, and the DELTA azimuth bin, for that particular time interval, are placed at zero as indicated at block 108. A point by point monopulse measurement is performed for both range and azimuth as indicated at block 110. This calculation is carried out for the apertures 42 and 46 in accordance with the following expression $$MMCol = \frac{IMAG[\Delta A \Sigma]}{\Sigma \Sigma^*} \text{ where}$$

(monopulse measurement) MM column are the column of cells or bins as shown in FIG. 5A–5D, IMAG is imaginary part of the complex number; $\Delta A$ is DELTA azimuth monopulse data and $\Sigma$ is the SUM monopulse data; and * is the conjugate.

The monopulse measurement ratio for range is in accordance with the following expression $$MMROW = \frac{IMAG[\Delta R \Sigma^*]}{\Sigma \Sigma^*} \text{ where}$$

NMROW is the row of cells or bins as shown in FIGS. 5A–5D, and $\Delta R$ is monopulse range data.

These ratios are then applied to a look up table in azimuth and range to place the current bin into proper range and azimuth cell.

The monopulse ratio obtained at block 110 of FIG. 6 thus corresponds to the angular location relative to the center of each processed area. This angular location is then converted at block 122 into a particular range bin and a particular azimuth bin depending on its particular value. The point by point processing in each of the successive look areas is carried out as previously discussed, and the current value in each of the bins is determined by adding the previous calculated value to the monopulse ratio.

The return energy in the individual range and azimuth bins is displayed in accordance with the ratio of the SUM and DELTA data. As embodied herein, and referring to FIG. 5D, the monopulse post detection integration map is displayed as indicated at block 130 of FIG. 3. This is implemented in the present embodiment by placing the SUM energy from aperture 44 directly into the DELTA range bin and DELTA azimuth bin selected in accordance with the look up table at 122. Thus, the SUM energy is added noncoherently as indicated at block 132 to the selected bin.

Figure 5D:
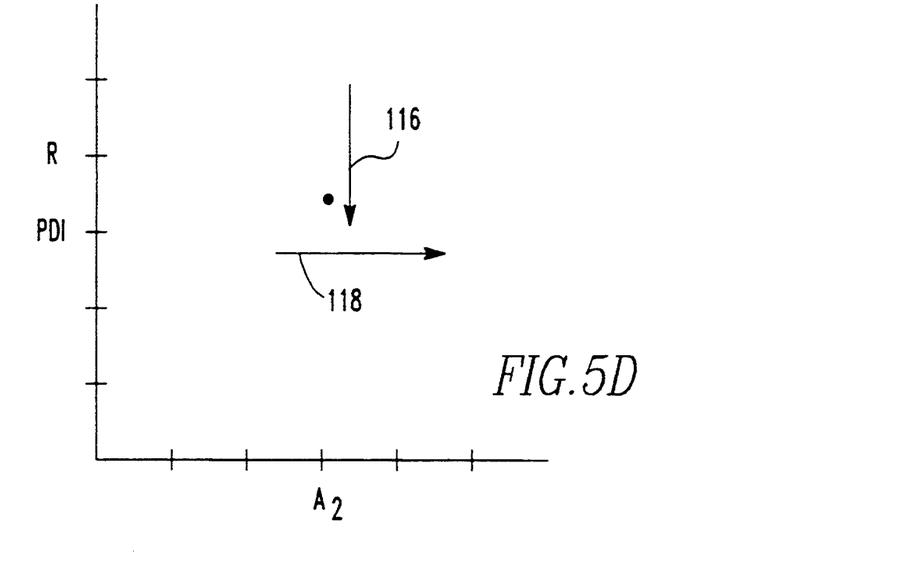
FIG. 5D illustrates a point target after post detection integration.

More specifically, calculated point is moved from its current location to the particular azimuth and range bin corresponding to a look up table as indicated at block 124. For example, if the ratio computed at 110 is zero or close to zero, there is no relocation of the return energy, and the point remains at its current location X as illustrated at FIG. 5D. If the ratio for range, for example, is at a plus value, the return energy is moved in the minus direction as indicated by arrow 118, for example, up to a maximum of four bins, depending upon the value of the ratio. If the ratio in azimuth for the return energy is in the plus category, then this return energy is moved in the minus direction as indicated by arrow 18, for example, up to a maximum of four bins. Similarly, if the ratio for range and the ratio for azimuth has a negative value, the return energy for the current cell is shifted in the positive direction.

In summary, the range displacement from the current range position is derived from the range DELTA/SUM ratio as above described and quantized to the nearest range bin. Similarly, the azimuth displacement from the current azimuth position is derived from the azimuth DELTA/SUM ratio and quantized to the nearest azimuth bin.

Therefore, for each range and azimuth cell or bin, a range and an azimuth monopulse measurement are performed to find the relative displacement from that cell to place the SUM energy. The monopulse position accuracy is a GAUSSIAN distribution about the true position. The standard deviation equals the RMS error equation where the signal to noise ratio is modified by the noncoherent integration factor to the 0.6 power. The maximum monopulse error is limited to plus or minus one beam width by editing the monopulse measurement according to the following equation.

$$B_e = N/(PI*D*)2*S/N).5$$

where $B_e$ = angular RMS pointing error (rad)
N = RF wavelength ft)
D = monopulse sub aperture displacement (feet)
S/N = signal to noise power ratio The map image is the detected output of the complex scene reflectivity as a function of position convolved with the system impulse response. The system impulse response determines the true resolution in contrast through real beam ground mapping, the SAR convolution is accomplished by multiplying the inverse FOURIER TRANSFORM of both the seen and the system function and then FOURIER TRANSFORMING back to the image domain. A simulation of the described embodiment has been made using synthetic and real data. The simulation is shown that in order to resolve two equal point targets 50% of the time their separation must exceed the width of one impulse response. If their separation does not exceed one impulse response width, the monopulse measurement yields the weighted centroid of the target but does not resolve them as two targets. In boundary regions such as shorelines or roads, the monopulse processing will sharpen the boundary edge normally degraded by the system impulse response. The improvement of the present invention is to provide the appearance of narrowing the system impulse response of the image. The point targets are thus stabilized to a very narrow point while line targets have narrow widths and area targets have sharp boundaries.

It will be apparent to those skilled in the art the various modifications and variation can be made in the system and method of the present invention without departing from the spirit and scope of the invention. Thus, it is intended that the present invention cover the modifications and variation of this invention provided they come within the scope of the appended claims and their equivalence.

What I claim is:

1. A method of sharpening impulse response of synthetic aperture return data of a synthetic aperture radar system, comprising:

collecting computed range and azimuth return data;
   forming three apertures of the collected computed data, one of the three apertures generating data corresponding to SUM weighting in range and azimuth, a second of the apertures generating data corresponding to SUM weighting in range and DELTA weighting in azimuth, and a third of the apertures generating data corresponding to SUM weighting in azimuth and DELTA weighting in range;
   transforming the generated data in each of the three apertures into a two dimensional map format;
   performing two dimensional monopulse measurement of a combined transformed generated data in the map format, having bins corresponding to range and azimuth;
   calculating the DELTA data in range and the DELTA data in azimuth for each of the bins; and
   displaying the return energy in the individual range and azimuth bins in accordance with a monopulse measurement ratio of the SUM data of the range and the DELTA data of the range in the range bins and a ratio of the SUM data of the azimuth and the DELTA data of the range in each azimuth bin.

2. The method of claim 1 wherein the step of performing the monopulse measurement in two dimension comprises:

computing the power of the SUM data in range and azimuth, the DELTA data in range, and the DELTA data in azimuth, for the respective apertures;
   comparing the power of the DELTA data in azimuth and the DELTA data in range with the power of the SUM data in range and azimuth; and
   setting the respective DELTA data in range and azimuth to zero at times when the corresponding DELTA data is greater than a predetermined amount above the power of the SUM data.

3. The method of claim 1 wherein the step of performing the monopulse measurement in two dimensions comprises:

computing for each return cell the monopulse measurement of range in accordance with the expression $$\frac{\Delta R \cdot \Sigma^*}{\Sigma \cdot \Sigma^*} \text{ and}$$

computing for each return cell the monopulse measurement of azimuth in accordance with the expression $$\left( \frac{\Delta A \cdot \Sigma^*}{\Sigma \cdot \Sigma^*} \right)$$

where $\Delta A$ is the DELTA azimuth data $\Delta R$ is the DELTA range data;
   and $\Sigma$ is the SUM data.

4. The method of claim 3 wherein the step of performing monopulse measurement includes;

shifting the transformed DELTA path in the map format to selected bins in accordance with the computed monopulse measurement in range and azimuth.

5. The method of claim 3 wherein the step of performing monopulse measurement includes converting monopulse measurement to specific $\Delta R$ bins and $\Delta A$ bins in accordance with a look up table.

6. The method of claim 1 wherein the step of performing the monopulse measurement includes calculating off boresight angles in accordance with a ratio of the SUM and DELTA data.

7. A synthetic aperture radar system, comprising:
means for collecting complex range and azimuth return data during each look of the synthetic aperture antenna;
means for storing the collected data in three memories;
means including the three memories including the three memories for generating data corresponding to sum weighting in range and azimuth, sum weighting in range and delta weighting in azimuth, and sum weighting in azimuth and delta weighting in range;
means for transforming the generated data in each of the three memories into a two dimensional map format;
means for performing two dimensional monopulse measurement of combined transformed generated data in the map format, the map format including bins corresponding to range azimuth;
means for calculating the DELTA data in range and the DELTA data in azimuth for each of the bins; and
displaying the return energy in the individual range and azimuth bins in accordance with the ratio of the SUM data in range and the DELTA data in range in the range bins, and a ratio of the SUM data in azimuth and the DELTA data in range in each azimuth bin.

8. The system of claim 7 wherein the means for performing the monopulse measurement in two dimensions comprises,
means for computing the power of the SUM data in range and azimuth, the DELTA data in range, and the DELTA data in azimuth, for the respective memories;
means for comparing the power of the DELTA data in azimuth and the DELTA data in range with the power of the SUM data in range and azimuth; and
setting the respective DELTA data in range and azimuth to zero at times when the corresponding DELTA data is greater than a predetermined amount above the power of the SUM data.

9. The system of claim 7 wherein the means for performing the monopulse measurement comprises:
means for computing the monopulse measurement of range in accordance with the expression $$\frac{\Delta R \times \Sigma^*}{\Sigma \times \Sigma^*}$$

and
means for computing the monopulse measurement of azimuth in accordance with the expression $$\frac{\Delta A \times \Sigma^*}{\Sigma \times \Sigma^*}$$

where $\nabla A$ is the azimuth DELTA, $\Delta R$ is the range DELTA data and $\Sigma$ is the SUM data.

10. The system of claim 9 wherein the means for performing monopulse measurement comprises means for shifting the transformed DELTA data in the map format to selected bins in accordance with the computed monopulse measurement in range and azimuth.

11. The system of claim 9 wherein the means for performing monopulse measurement comprises means for converting the monopulse measurement to specific $\Delta R$ bins and specific $\Delta A$ bins in accordance with a look up table.

12. The system of claim 7 wherein the means for performing the monopulse measurement includes means for calculating off boresight angles in accordance with the ratio of the SUM and DELTA data.

* * * * *